F. WERTH.
APPARATUS FOR POLISHING TUBES, RODS, AND THE LIKE.
APPLICATION FILED JAN. 5, 1911.

997,167.

Patented July 4, 1911.

WITNESSES:
John Murtagh
L. J. Murphy

INVENTOR
Federico Werth
BY Goepel & Goepel
ATTORNEYS.

UNITED STATES PATENT OFFICE.

FEDERICO WERTH, OF MILAN, ITALY.

APPARATUS FOR POLISHING TUBES, RODS, AND THE LIKE.

997,167. Specification of Letters Patent. Patented July 4, 1911.

Application filed January 5, 1911. Serial No. 600,898.

*To all whom it may concern:*

Be it known that I, FEDERICO WERTH, a subject of the Emperor of Germany, residing as 18 Corso Vercelli, Milan, in the Kingdom of Italy, have invented certain new and useful Improvements in Apparatus for Polishing Tubes, Rods, and the Like, of which the following is a specification.

With the apparatus hitherto employed for cleaning, polishing and working round objects, such as tubes, rods, cones and the like, it has been customary to treat these objects by means of rotary disks, brushes and the like, rotating on different axes, the rotary disks being pressed by mechanical devices against the object to be treated. With such devices different driving shafts and other complicated mechanism were necessary, so that the particular machine required a large amount of space and was not simple in action.

An example of the invention is illustrated in the accompanying drawing.

Figure 1:
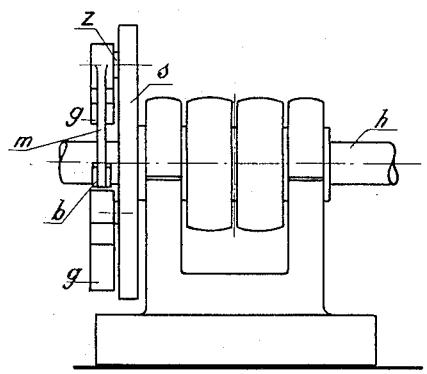
Figure 2:
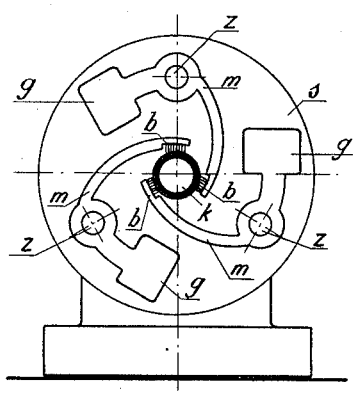

Figure 1 is a side elevation, and Fig. 2 a front elevation of the apparatus.

A rotating disk —s— or a similar part with a central hole, the diameter of which is suited to the diameter of the largest tube or rod —k— that is to be passed through, carries on its periphery one or more two-arm levers —m—, which are rotatively seated on pins —z—, which are provided on the disk itself. On one of its ends each lever —m— carries a weight —g— and on the other end the tool or implement for example a brush —b— required for the work. The arm of the lever that carries the weight —g— is much heavier than the arm that carries the tool. If the disk —s— be rotated quickly enough the weight —g— on each lever will be subjected to centrifugal force, and consequently the implement —b— be pressed toward the center of rotation, and against the object drawn through the central hole. The pressure and consequently the effective output of the implement —b— is greater accordingly as the weight —g— is heavier, and the speed of the disk —s— greater. If, on the other hand, it be desired to work the inner surface of large hollow objects such as tubes, cylinders and the like, the implement itself is arranged in the weight, itself, which is thus pressed from the center of rotation, and so against the inside of the tube, and the implement made effective.

It will be seen that this invention allows of machines constructed in a very simple manner to be employed for working round objects, these machines having great advantages over known machines, and insuring not only success in an economic sense, but considerable simplification of the former mode of employment. The working of the objects in accordance with the said patents necessitates the employment of large complicated machines, the same result, and a still larger output being obtained with the simple machine according to the present invention.

From the figures of the drawing it will be seen that for actuating the machine only one driving-device is necessary, that no adjustment of the machine is necessary, that the exchanging of the implements can be effected in an exceedingly simple manner, and that not only round, but also conical and all other solids of revolution may be worked therewith, as the pressure regulated by centrifugal force adapts itself to any form.

Having now particularly described and ascertained the nature of my said invention, and in what manner the same is to be performed, I declare that what I claim is:—

1. An apparatus for polishing and working tubes, rods and the like, comprising a rotating body, adjustably weighted arms pivoted thereto on axes parallel with the axis of rotation of said body, and working implements on said arms.

2. An apparatus for polishing and working tubes, rods and the like, comprising a rotating body, arms pivoted thereto on axes parallel with the axis of rotation of said body, weights on said arms, and working implements on said arms.

3. An apparatus for polishing and working tubes, rods and the like, comprising a disk having a central hole, arms pivoted to said disk on axes parallel with the axis of rotation, weights on said arms, working implements on said arms arranged in juxtaposition to said opening, and means for rotating said disk.

In testimony that I claim the foregoing as my invention, I have signed my name in the presence of two subscribing witnesses.

FEDERICO WERTH.

Witnesses:
  OSCAR PÜMPER,
  P. DE FRANCISESI.